Figure 1:
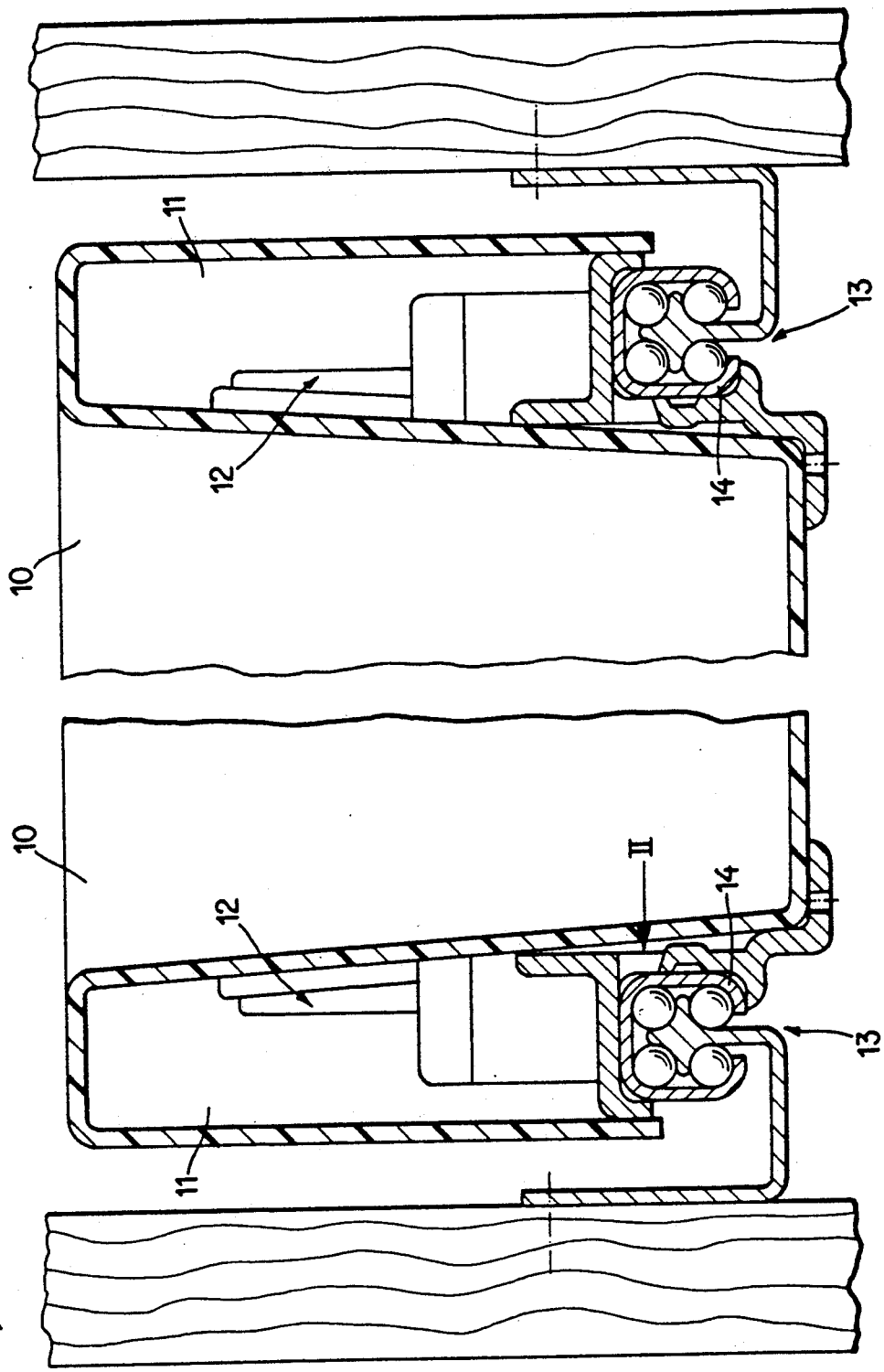

United States Patent [19]

Faust

[11] Patent Number: 5,020,869
[45] Date of Patent: Jun. 4, 1991

[54] DRAWER RUNNER FOR DRAWERS PREFERABLY MADE OF PLASTIC

[75] Inventor: Karl-Volker Faust, Bielefeld, Fed. Rep. of Germany

[73] Assignee: Paul Hettich GmbH & Co., Kirchlengern, Fed. Rep. of Germany

[21] Appl. No.: 335,784

[22] PCT Filed: Jul. 13, 1988

[86] PCT No.: PCT/DE88/00416

§ 371 Date: Apr. 5, 1989

§ 102(e) Date: Apr. 5, 1989

[87] PCT Pub. No.: WO89/01305

PCT Pub. Date: Feb. 23, 1989

[30] Foreign Application Priority Data

Aug. 7, 1987 [DE] Fed. Rep. of Germany .... 8710830.5

[51] Int. Cl.[5] .......................................... A47B 88/14
[52] U.S. Cl. ................... 312/341.1; 403/335; 403/375; 384/18; 384/22
[58] Field of Search ............... 312/341.1, 330.1, 332, 312/335, 337, 342, 343, 346, 347; 403/326, 335, 375, 330; 384/18, 22

[56] References Cited

U.S. PATENT DOCUMENTS

| 3,156,282 | 11/1964 | Bedford, Jr. | 403/375 |
| 4,173,380 | 11/1979 | Dupree | 312/346 |
| 4,653,821 | 3/1987 | Faust | 312/330.1 |
| 4,717,195 | 1/1988 | Okuyama et al. | 403/330 |
| 4,792,195 | 12/1988 | Adriaansen | 312/330.1 |
| 4,810,045 | 3/1989 | Lautenschlager | 312/341.1 |

FOREIGN PATENT DOCUMENTS

| 0030290 | 6/1981 | European Pat. Off. | |
| 8508596 | 6/1985 | Fed. Rep. of Germany | |
| 3347540 | 7/1985 | Fed. Rep. of Germany | |
| 3546369 | 7/1987 | Fed. Rep. of Germany | |
| 3609621 | 9/1987 | Fed. Rep. of Germany | 312/330.1 |
| 1369234 | 10/1974 | United Kingdom | 403/326 |

Primary Examiner—James R. Brittain
Assistant Examiner—Brian K. Green
Attorney, Agent, or Firm—Peter K. Kontler

[57] ABSTRACT

A drawer for an article of furniture has a pair of oppositely disposed sides which are parallel to the direction of movement of the drawer when the latter is opened and closed. Each of these sides is formed with an elongated pocket which is designed to receive a runner for the drawer. Such a runner includes an elongated support which is symmetrical about a median plane dividing the support longitudinally and can be mounted at either side of the drawer. In its mounted condition, the support extends in the direction of movement of the drawer. The runner further includes an elongated guide rail which serves to guide the drawer during movement. The guide rail is designed to be releasably connected to the support in such a manner that the guide rail extends in parallelism with the support and is prevented from shifting longitudinally relative thereto. The means for releasably connecting the guide rail to the support includes one or two grooves in the guide rail and one or two cooperating detents on the support. The detent or detents are symmetrically arranged about the median plane of the support.

18 Claims, 4 Drawing Sheets

Fig. 5
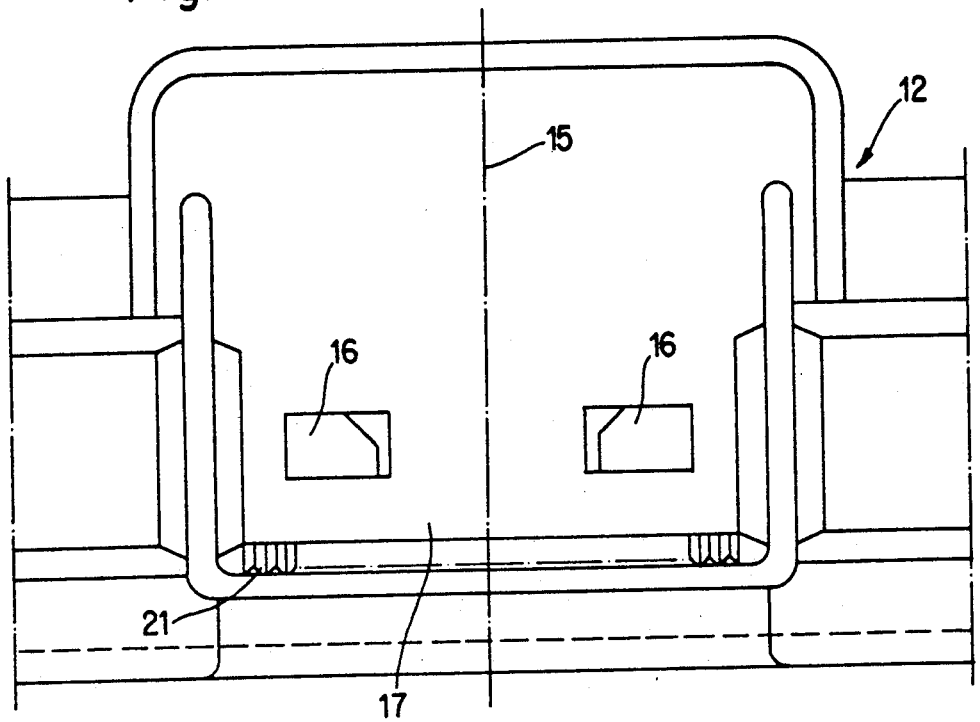
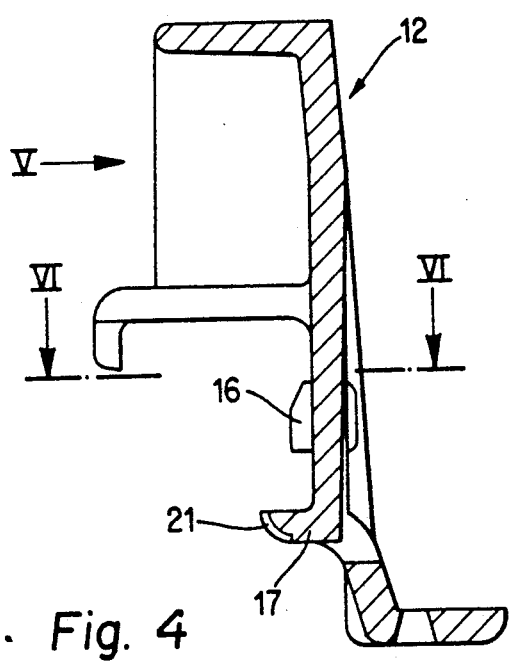
Fig. 4
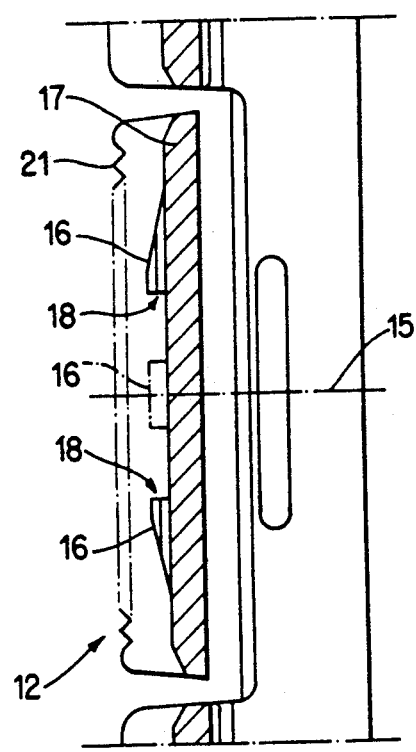
Fig. 6

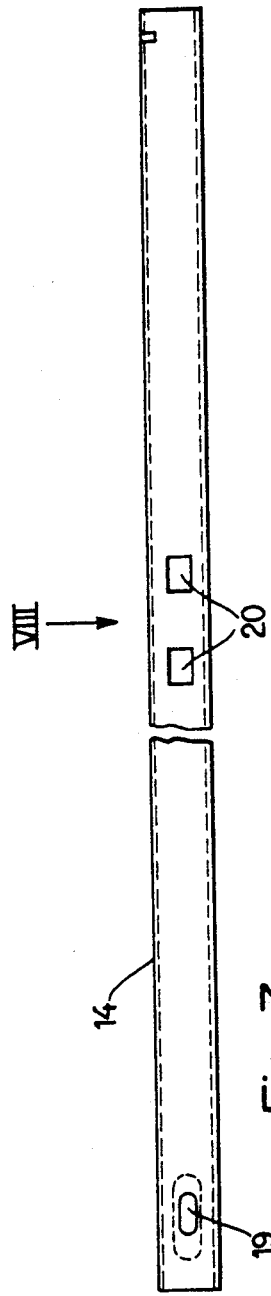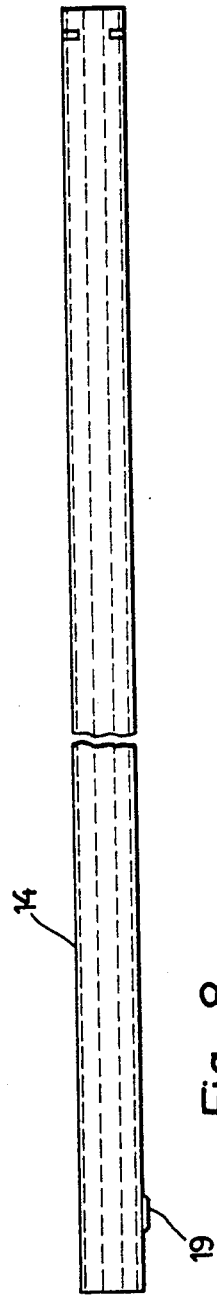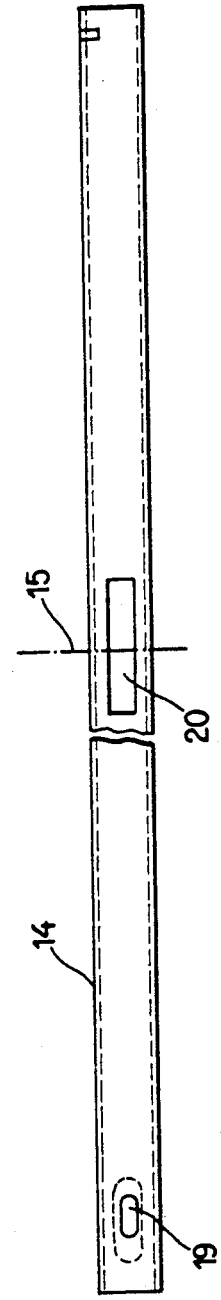

DRAWER RUNNER FOR DRAWERS PREFERABLY MADE OF PLASTIC

The present invention relates to a drawer runner for drawers which are preferably made of plastic and have pockets in their longitudinal sides for respective drawer runners. The drawer runner is composed of an adapter as well as a withdrawal guide which is releasably connected to the adapter and the adapter is mountable in either a left or a right pocket. A slide rail of the withdrawal guide is secured to the adapter, by means of a locking device which can catch in a locking groove of the slide rail, against longitudinal shifting tending to cause separation.

It is an object of the present invention to design a drawer runner of the above type, which includes an adapter capable of being selectively mounted on the left or the right, in a simple manner and such that an adequate construction for the rightleft interchangeability of the adapter is achieved as regards the engagement between the adapter and the slide rail.

According to the invention, this object is achieved in that the locking device includes at least one detent which is symmetrical about the median plane dividing the adapter longitudinally and in that, for two detents (16), these are symmetrically arranged about the median plane (15) of the adapter.

This relatively simple structural expedient ensures that the slide rail of such a withdrawal guide will always be secured against longitudinal shifting in the same position regardless of whether the complete drawer runner is employed on the left or the right of a drawer.

It is possible, within the scope of the present invention, to arrange the detents on a common tongue of the adapter which is elastically displaceable sidewise relative to the slide rail. However, it is also conceivable to arrange each detent on a separate tongue of the adapter which is elastically displaceable sidewise relative to the slide rail.

The former structural configuration is to be preferred to the extent that it is particularly simple to achieve during manufacture of the adapter.

If, for structural reasons, which can be imposed by fixing of the adapter to a drawer, central placement of the detents on a common tongue is not possible, the second structural configuration can be employed. The underlying concept of the invention, namely, that locking of the slide rail relative to the adapter can always occur at the same location whether the installation is on the left or the right, is achievable with the second structural configuration also.

Other features of the invention constitute the subject matter of additional subclaims.

Exemplary embodiments of the invention, which are described in more detail below, are illustrated in the accompanying drawings.

Figure 2:
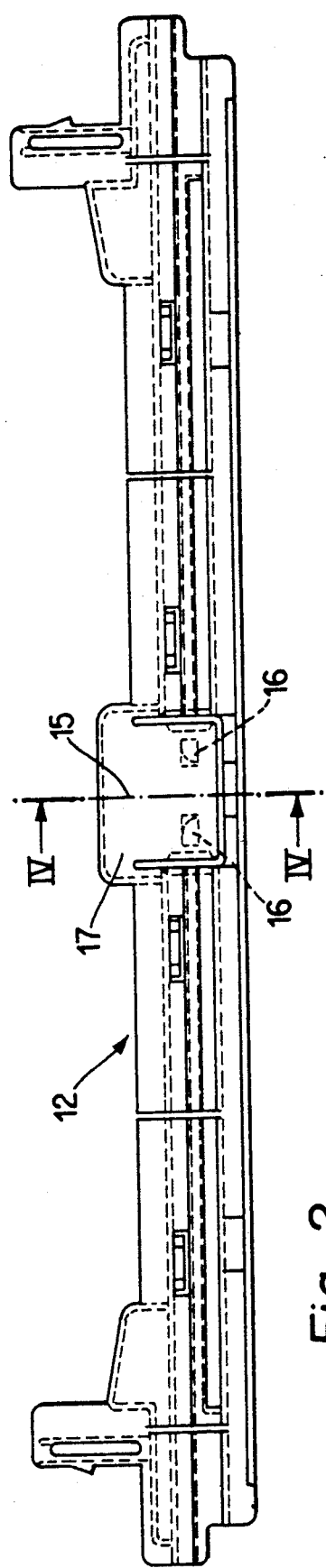
Figure 3:
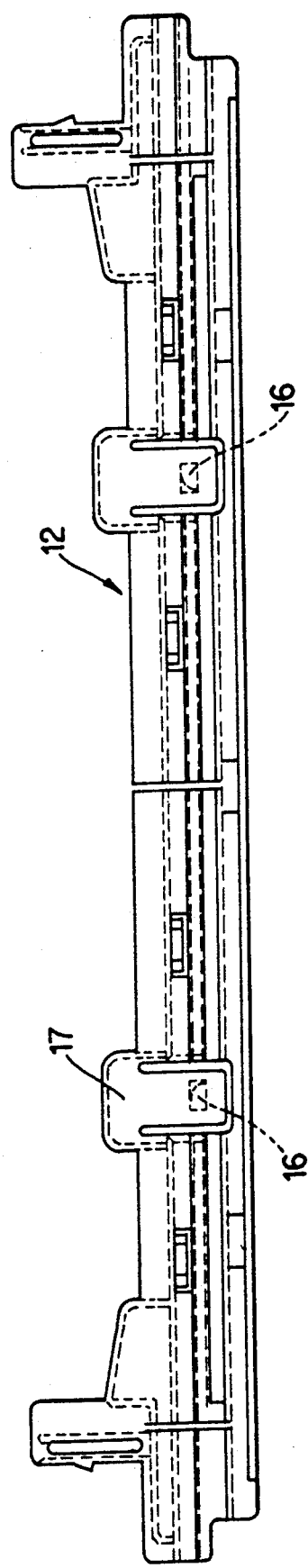

There is shown:

FIG. 1 a vertical section through the left side wall of a drawer of a piece of furniture with a drawer runner consisting of an adapter and a withdrawal guide, FIG. 2 a view of the adapter of the drawer runner in the direction of the arrow II of FIG. 1, FIG. 3 a view similar to FIG. 2 of an adapter in accordance with another exemplary embodiment of the invention, FIG. 4 a section along the line IV—IV of FIG. 2, FIG. 5 a view in the direction of the arrow V of FIG. 4, FIG. 6 a section along the line VI—VI of FIG. 4, FIG. 7 a view of the slide rail of the drawer runner according to FIG. 1 in the viewing direction of the arrow II of FIG. 1, FIG. 8 a view in the direction of the arrow VIII of FIG. 7, and FIG. 9 is a view similar to that of FIG. 7 but showing a modified guide rail.

The reference numeral 10 in FIG. 1 identifies a plastic drawer which, in the illustrated left-hand longitudinal side as well as the nonillustrated right-hand longitudinal side, is provided with a pocket 11 for an elongated supporting element or adapter 12.

This adapter 12 is designed in such a manner that it can be mounted in either the left-hand or the right-hand pocket 11 of the drawer 10.

This adapter 12, together with a withdrawal guide 13 whose elongated guide element or slide rail 14 is releasably connected to the adapter 12, constitutes a drawer runner.

A locking device which is still to be described secures the slide rail 14 of the withdrawal guide 13 against longitudinal shifting relative to the adapter 12 in a sense tending to cause separation.

Reference is had to FIGS. 2 and 4 thru 8 for a description of the locking device.

In FIG. 2, the adapter 12 is shown in elevation in the viewing direction indicated by the arrow II of FIG. 1.

FIG. 2 in conjunction with FIGS. 4 to 6 makes it clear that the adapter 12 is not only symmetrical—with reference to a transverse median or central plane 15 which divides the adapter into two mirror symmetrical halves—but that, in addition, two detents 16 are disposed at opposite sides of and are substantially mirror symmetrical to each other with reference to this median plane 15 on a common tongue 17 which is elastically displaceable transversely of the longitudinal direction of the elongated adapter 12 and sidewise relative to the slide rail 14 secured to the adapter 12.

As is particularly evident from FIG. 6, both of the detents 16 are beveled in directions from the edges 18 thereof facing the median plane 15 towards the free ends of the adapter 12. In this manner, bearing inclines are formed which lead to an elastic sidewise displacement of the tongue 17 upon introduction of the slide rail 14 into the adapter 12.

FIGS. 7 and 8 make it clear that the front end of the slide rail 14 as seen in the direction of withdrawal of the drawer runner is provided with a pronounced bead 19 which is in alignment with the detents 16. This bead 19, which can be replaced by another protuberance in the front region of the slide rail 14, ensures that the slide rail 14 is able to reliably slide over an edge 18 of a detent 16 even when the tongue 17, due to its inherent elasticity, projects slightly beyond the corresponding wall of the slide rail 14 when the slide rail 14 is introduced into the adapter 12.

The central region of the slide rail 14 is provided with two locking grooves 20 which are likewise symmetrically arranged about the median plane of the slide rail 14.

Depending upon the position in which the adapter 12 is installed, one of the two detents 16 catches in one of the above mentioned locking grooves 20 and thus secures the slide rail 14 against longitudinal shifting relative to the adapter in a sense to separate these two components. The respective neighboring detent 16 then catches in the associated second locking groove 20.

FIG. 3 makes it clear that each of the two detents 16 can be arranged on a separate tongue 17 of the adapter 12. However, these two detents 16 on their separate tongues 17 are again symmetrically disposed about the median plane 15 of the adapter 12.

In the case of an adapter structure according to the exemplary embodiment of FIG. 2, it is also possible to place only a single, appropriately elongated locking groove 20 in the central region of the slide rail 14.

On the other hand, if the two detents 16 are arranged on relatively widely spaced separate tongues 17 as shown in FIG. 3, the provision of two locking grooves 20 which are independently punched into the slide rail 14 is to be preferred for reasons of stability.

As is clear from FIGS. 4 to 6, the lower end of the tongue 17 in the position of use is provided with a fluted handle 21 which not only supports a portion of the slide rail 14 but is especially intended for convenient elastic displacement of the tongue 17 by hand, namely, when the slide rail 14 is to be intentionally separated from the adapter 12.

In FIG. 6, broken lines indicate that only a single detent 16, which must then be formed symmetrically about the median plane 15 of the adapter, can be provided within the scope of the invention. In this case, only a single locking groove is required in the slide rail 14.

I claim:

1. A runner for a drawer which is movable in a predetermined direction and has a pair of oppositely disposed sides generally parallel to the direction of movement of the drawer when the drawer is mounted in an article of furniture, particularly for a plastic drawer in which the oppositely disposed sides are provided with pockets for respective runners, said runner comprising an elongated supporting element designed to be mounted at either of the oppositely disposed sides of the drawer so as to extend in the direction movement of the drawer, said supporting element having a transverse central plane which divides said supporting element into two mirror symmetrical halves and said supporting element comprising a one-piece tongue which is displaceable transversely of the longitudinal direction of said supporting element; an elongated guide element for guiding the drawer during movement and designed to be releasably connected to said supporting element so as to extend generally parallel thereto; and cooperating first and second locking means on said supporting element and said guide element, respectively, for releasably connecting said guide element to said supporting element so as to inhibit relative longitudinal displacement of said guide element and said supporting element, said first locking means including a pair of locking elements on said tongue and having two halves which are substantially mirror symmetrical to each other with reference to said plane.

2. The runner of claim 1, wherein said supporting element consists essentially of plastic.

3. The runner of claim 1, wherein said guide element comprises a rail.

4. The runner of claim 1, wherein said second locking means comprises at least one groove.

5. The runner of claim 1, wherein said first locking means comprises detent means.

6. The runner of claim 5, wherein said detent means comprises a pair of detents at opposite sides of said plane.

7. The runner of claim 5, wherein said detent means is constituted by a single detent.

8. The runner of claim 1, wherein said tongue is elastic.

9. The runner of claim 1, wherein one of said locking means comprises a pair of spaced detents having respective ends which face away from one another and are separated by a predetermined distance, the other of said locking means being constituted by a single groove having a length at least equal to said predetermined distance.

10. The runner of claim 1, wherein one of said locking means comprises a pair of spaced detents and the other of said locking means comprises a pair of spaced grooves.

11. The runner of claim 1, wherein one of said locking means comprises a pair of detents each having longitudinally spaced first and second ends, said first ends facing one another, and each of said detents sloping in such a manner that the height of the respective detent decreases in a direction from the first end towards the second end.

12. The runner of claim 11, wherein said one locking means is said first locking means, said supporting element and said guide element each having a respective surface which is provided with the respective locking means, and said surface of said guide element being formed with a protuberance.

13. The runner of claim 12, wherein said protuberance is arranged to be in alignment with said detents when said guide element is connected to said supporting element.

14. The runner of claim 12, wherein said guide element has an end which constitutes a leading end thereof during withdrawal of the drawer from an article of furniture, said protuberance being disposed at said end.

15. The runner of claim 1, wherein comprises a tongue which is displaceable transversely of the longitudinal direction of said supporting element, said tongue has a marginal portion which is arranged to support said guide element, and said marginal portion being designed as a handle for manual displacement of said tongue.

16. The runner of claim 15, wherein said marginal portion is fluted.

17. A runner for a drawer which is movable in a predetermined direction and has a pair of oppositely disposed sides generally parallel to the direction of movement of the drawer when the drawer is mounted in an article of furniture, particularly for a plastic drawer in which the oppositely disposed sides are provided wit pockets for the respective runners, said runner comprising an elongated supporting element designed to be mounted at either of the oppositely disposed sides of the drawer so as to extend in the direction of movement of the drawer, said supporting element having a transverse central plane which divides said supporting element into two mirror symmetrical halves and said supporting element comprising a pair of tongues which are displaceable transversely of the longitudinal direction of said supporting element; an elongated guide element for guiding the drawer during movement and designed to be releasably connected to said supporting element so as to extend generally parallel thereto; and cooperating first and second locking means on said supporting element and said guide element, respectively, for releasably connecting said guide element to said supporting element so as to inhibit relative longitudinal displacement of said guide element and said supporting element, said first locking means having two halves which are substantially mirror symmetrical to each other with reference to said plane and said first locking means including a pair of locking elements, one locking element of said pair of locking elements being disposed on one of said tongues and the other locking element of said pair of locking elements being disposed on the other of said tongues.

18. The runner of claim 17, wherein said tongues are elastic.

* * * * *